United States Patent
Meiswinkel (10) Patent No.: US 11,434,085 B1
(45) Date of Patent: Sep. 6, 2022

(54) INDUCTION SCOOP PUSHER

(71) Applicant: Amazon Technologies, Inc., Seattle, WA (US)

(72) Inventor: Kent Belden Meiswinkel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 16/878,237

(22) Filed: May 19, 2020

(51) Int. Cl.
| | |
|---|---|
| *B65G 47/82* | (2006.01) |
| *B65B 35/20* | (2006.01) |
| *B65B 35/40* | (2006.01) |
| *B65B 35/56* | (2006.01) |

(52) U.S. Cl.
CPC .............. *B65G 47/82* (2013.01); *B65B 35/40* (2013.01); *B65B 35/56* (2013.01)

(58) Field of Classification Search
None
See application file for complete search history.

(56) References Cited

U.S. PATENT DOCUMENTS

| | | | | |
|---|---|---|---|---|
| 5,871,246 A * | 2/1999 | Simdom | ................. | A01B 1/026 294/58 |
| 7,073,310 B1 * | 7/2006 | Long | ..................... | B65B 25/145 53/566 |
| 7,587,879 B2 * | 9/2009 | Guttinger | ............... | B65G 47/32 53/169 |
| 2004/0079715 A1 * | 4/2004 | Richter | ................... | A47F 1/126 211/59.3 |

OTHER PUBLICATIONS

U.S. Appl. No. 16/878,159, "Pneumatic Mandrel for a Packaging System", filed May 19, 2020.
U.S. Appl. No. 16/831,431, "Automatic Rotary Inserting Machine", filed Mar. 26, 2020.

* cited by examiner

*Primary Examiner* — Hemant Desai
*Assistant Examiner* — Tanzim Imam
(74) *Attorney, Agent, or Firm* — Patterson + Sheridan, LLP (57) ABSTRACT

Embodiments herein describe a pusher for inducting items into a packaging system. In one embodiment, the pusher moves an item through a mandrel and into a loading volume where the item is enclosed in a package. To mitigate the likelihood the item becomes stuck or does not fully come to rest in the loading volume, the pusher has a scoop that pushes the item through the mandrel into the loading volume. Further, the scoop is designed to perform a springing action to help move the item into the loading volume. In one embodiment, the scoop is cantilevered where an upper edge connects to a back side of the pusher but a lower edge is not connected to the pusher, to help perform the springing action. When the pusher stops moving, the compressed scoop performs the springing action to help propel the item into the loading volume.

13 Claims, 9 Drawing Sheets

FIG. 10 though the mandrel into the loading volume. Further, the

INDUCTION SCOOP PUSHER

BACKGROUND

The present invention relates to a pusher with a scoop for moving items into a packaging machine.

Some packaging systems require an associate or machine to place items into a loading volume where the items are sealed in a package that then mailed to, e.g., fulfill a customer order. Placing the items into the loading volume so they can be packaged in the flexible material presents many challenges, often caused by the various types of items that need to be packaged. For example, the weight, size, and material of the item may impact the ability of the packaging system to consistently move the item into the loading volume. That is, the amount of force needed to move a lightweight item into the loading volume may be much different than the amount of force needed to move a heavy or bulky item into the loading volume.

BRIEF DESCRIPTION OF DRAWINGS

Various embodiments in accordance with the present disclosure will be described with reference to the drawings, where like designations denote like elements.

DETAILED DESCRIPTION

Embodiments herein describe a pusher for inducting items into a packaging system. In one embodiment, the pusher moves an item through a mandrel and into a loading volume where the item is enclosed in a package. To mitigate the likelihood the item becomes stuck or does not fully come to rest in the loading volume, the pusher has a scooped shape surface (referred to herein as a scoop) that pushes the item scoop can perform a springing action to help propel the item into the loading volume. In one embodiment, the scoop is cantilevered where an upper edge connects to a back side of the pusher but a lower edge (e.g., a leading edge that primarily contacts the item being moved) is not connected to the pusher, to help perform the springing action. As the pusher moves an item into the mandrel, the item applies a force in the opposite direction which compresses the cantilevered scoop. When the acceleration of the pusher decreases below a threshold, the compressed scoop performs a springing action to help propel the item into the loading volume, thereby mitigating the likelihood the item becomes stuck on the mandrel or does not fully come to rest in the loading volume.

In one embodiment, the pusher includes flexible side walls that contact side walls of the mandrel as the pusher travels through the mandrel. In one embodiment, the side walls of the mandrel compress the side walls of the pusher inward towards the scooped surface. In one embodiment, the spacing between the sidewalls of the mandrel decreases until it is less than the spacing between the flexible sidewalls of the pusher when in an uncompressed state. Thus, when the pusher is inserted into the mandrel, the sidewalls of the mandrels compress the sidewalls of the pusher. This sliding positive contact between the sidewalls of the pusher and the mandrel can help mitigate the likelihood that an item (e.g., items with flexible packaging) get stuck or jammed between the sidewalls of the pusher and the sidewalls of the mandrel.

Figure 1:
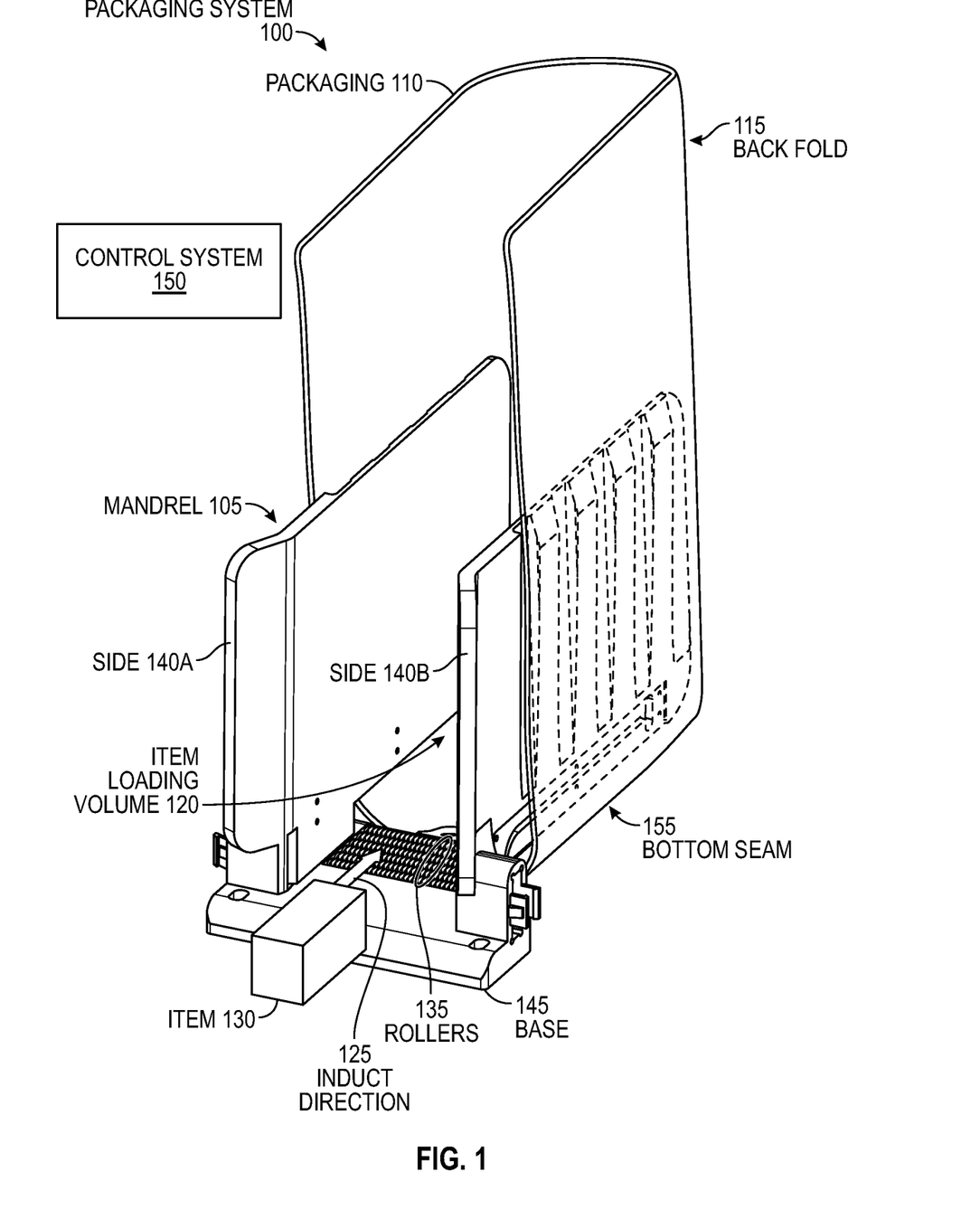
FIG. 1 illustrates a mandrel in a packaging system, according to one embodiment described herein.

FIG. 1 illustrates a mandrel 105 in a packaging system 100, according to one embodiment described herein. The mandrel 105 provides an item loading volume 120 where an item 130 is placed so that it can be enclosed by packaging 110. In this example, the item 130 is moved along an induct direction 125 (or an induction path) into the loading volume 120. As discussed below, a pusher (not shown in FIG. 1) moves the item 130 (e.g., pushes the item) over a base 145 of the mandrel 105 and rollers 135 into the loading volume 120.

The mandrel 105 includes sides 140A and 140B extending vertically from the base 145 (e.g., in a direction perpendicular to a top surface of the mandrel 105). As shown, the sides 140A-B separate the packaging 110 (e.g., a flexible packaging material) to form an item loading volume between the packaging 110. That is, the packaging 110 wraps around the two sides 140 such that a back fold 115 (or back seam) of the packaging 110 is opposite a side of the mandrel 105 where the item 130 is inducted. The back fold 115 serves as a back stop to prevent items from exiting the opposite side of the mandrel 105. Further, the two folds of the packaging 110 are sealed together underneath the mandrel 105 at a bottom seam 155. This bottom seam 155 provides support for the item 130 as it moves into the loading volume 120. Put differently, once the item 130 moves over the base 145 and the rollers 135 and into the loading volume 120 along the induct direction 125, the item 130 rests on the bottom seam 155.

Once in the loading volume 120, the packaging system can pull the packaging 110 down such that the item 130 is now below the mandrel 105. That is, in one embodiment, the packaging system 100 includes a feeding system (not shown) above the mandrel 105 that continuously provides packaging 110. The feeding system may include a roll of packaging 110. As the packaging 110 is pulled down (after an item 130 is moved into the loading volume 120), the packaging 110 is folded along the back fold 115 such that one half of the packaging 110 slides along the side 140A while the other half slides along the side 140B.

After pulling the packaging 110 and the item 130 down, a sealing apparatus (not shown) can seal the packaging 110 along an axis that is above the item 130 but still below the mandrel 105. In one embodiment, the sealing apparatus seals two sides of the packaging 110: a top side that is above the item 130 and a front side that is in front of the item 130 (in a direction that is opposite of the induct direction 125). Because the two folds of the packaging 110 were already sealed on a bottom side by the bottom seam 155 and a back side by the back fold 115, sealing the top and the front sides completely encloses the item 130 in the packaging 110, thereby creating a package (or envelope) in which the item 130 can be mailed. For example, a shipping label can be attached to the outside of the packaging 110 and the package can be cut from the remaining packaging 110. That is, the packaging 110 can be cut at the top side to remove the sealed item 130 from the remaining packaging 110.

In one embodiment, sealing the top side of the package also creates the bottom seam 155 for the next item being loading into the mandrel 105. Stated differently, when sealing the top side of the package for the already loaded item 130, the sealing apparatus can create the bottom seam 155 for another package. The pusher can then load the next item into the loading volume 120 formed by the bottom seam 155 where the process can repeat—i.e., once loaded, the packaging system 100 can again pull down the packaging 110 (i.e., the down direction in FIG. 1) so that the item is below the mandrel 105 and the sealing apparatus can seal the top and front sides of the packaging 110 to enclose the item.

Because the sealing apparatus seals the front side of the packaging 110 in order to fully enclose the item in the packaging 110, it is desirable that the item 130 be moved completely off the mandrel 105 and into the loading volume 120. If the item 130 remains partially on the mandrel 105, or is not moved far enough back towards the back fold 115, when sealing the front side of the packaging 110, a portion of the item 130 may be at (or protruding from) the front side. As a result, the sealing apparatus may be unable to form a complete seal at the front side, or may damage the item during the sealing process. To mitigate the likelihood that an item does not fully move into the loading volume 120, in the embodiments below, the pusher that moves the item 130 into the loading volume 120 is designed to ensure that a portion of the item 130 does not get stuck (or come to rest) on the mandrel 105. Further, the mandrel 105 can also have a pneumatic system for aiding the pusher in ensuring the item 130 moves into the loading volume 120. In one embodiment, the mandrel 105 uses one or more directed airflows to help move the item 130 into the loading volume 120.

The packaging system 100 includes a control system 150 which can include hardware, software, firmware, and combinations thereof. For example, the control system 150 may include one or more processors or one or more programmable logic controllers (PLC) for controlling the packaging system 100. In one embodiment, the control system 150 may execute software applications or firmware that control the actions of the various components in the packaging system 100. In general, the control system 150 includes logic for controlling the a machine that moves the pusher to induct the item 130 into the loading volume (e.g., a pushing system), pneumatics in the mandrel 105, the feeding system, the sealing apparatus, etc.

Figure 2:
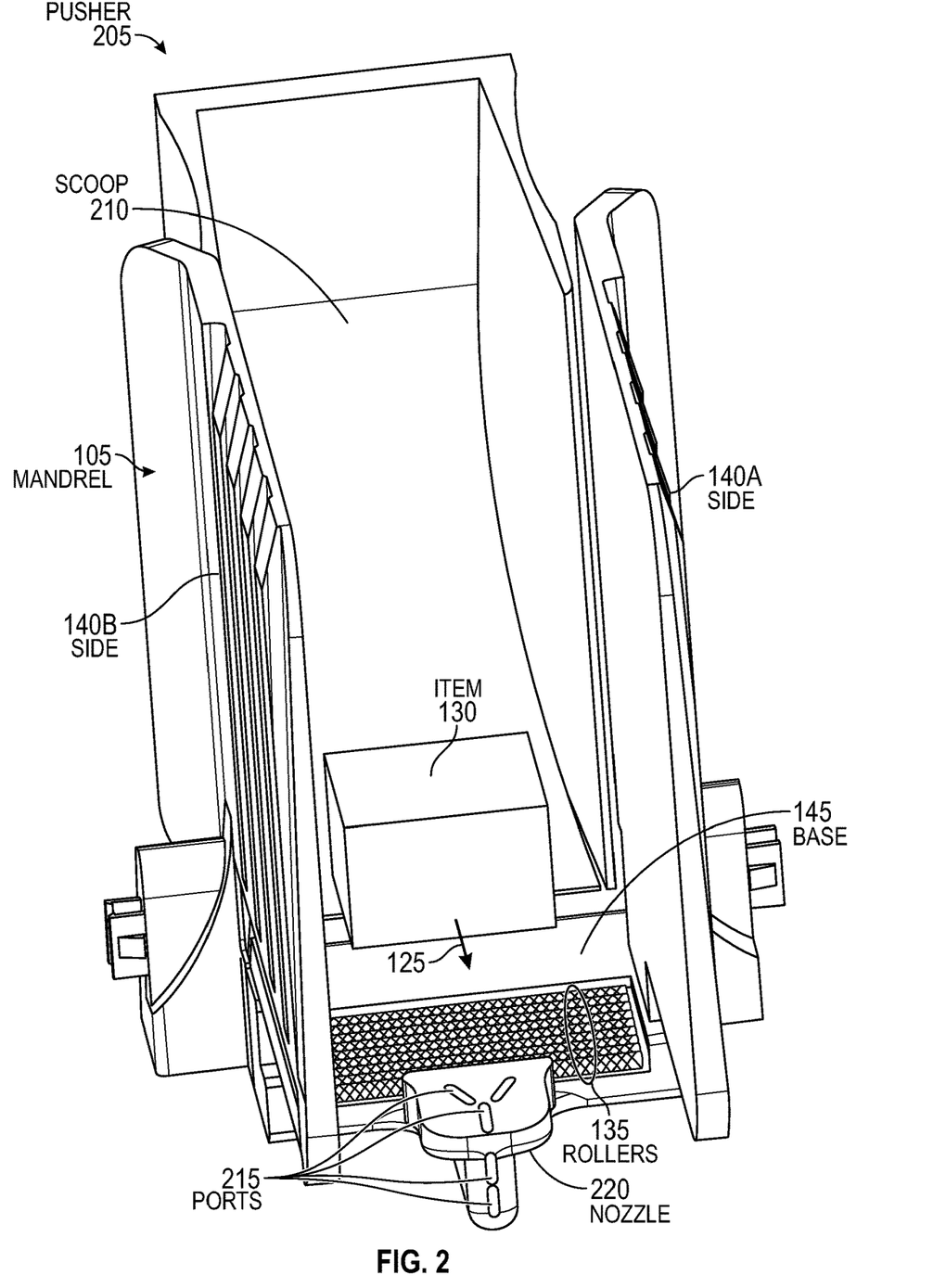
FIG. 2 illustrates a pusher moving an item through the mandrel in FIG. 1, according to one embodiment described herein.

FIG. 2 illustrates a pusher 205 moving an item through the mandrel 105 in FIG. 1, according to one embodiment described herein. For clarity, the packaging 110 has been omitted. Further, FIG. 2 illustrates a front view of the mandrel 105 rather than the back view provided in FIG. 1.

As shown, the pusher 205 moves the item 130 into the mandrel 105 along the induct direction 125. In this embodiment, the pusher 205 is inserted into the mandrel 105 such that the pusher 205 is disposed between the sides 140A-B of the mandrel 105. As described in later figures, the sides of the pusher 205 may contact the sides 140A-B of the mandrel 105.

The pusher 205 includes a scoop 210 (e.g., a scooped shaped surface) primarily responsible for moving the item 130 through the mandrel 105 and into the item loading volume. The parabolic or curved shape of the scoop 210 provides several advantages. First, the scoop 210 helps to slide the item 130 along the base 145 of the mandrel 105 relative to a vertical surface (e.g., a surface that is perpendicular to the base 145. Stated differently, the scoop 210 is less likely to cause the item 130 to become stuck or jammed between the scoop 210 and the base 145 relative to using a vertical surface to push the item 130 through the mandrel 105. Second, the scoop 210 can perform a springing action that moves the items 130 up and in the induct direction 125 so the item 130 is propelled into the item loading volume. Third, the parabolic shape of the scoop 210 propels the item when performing the spring action, or when an item reflects off the scoop 210, along a straight line that increases the likelihood the item will land in the loading volume. However, while the scoop 210 is illustrated with a curved or parabolic shape, in another embodiment, the scoop 210 is a flat surface that is mounted at an angle relative to a back side of the pusher 205 (where the angle is less than 90 degrees, or less than 60 degrees, or less than 45 degrees). In that embodiment, the scoop 210 is a flat surface that is slanted at an angle relative to the back side and still has the first and second advantages described above. Fourth, the curved surface of the scoop 210 can lift items higher than planar surfaces, so that when the pusher 205 reaches the item loading volume, the items drop down off the scoop, and as a result, are more likely to move into the item loading volume rather than becoming stuck on the mandrel 105.

The mandrel 105 can include several features for helping to move the item 130 through the mandrel 105 and into the loading volume. For example, the rollers 135 can reduce the friction between the item 130 and the mandrel 105. The rollers 135 may be unpowered or powered. Further, in one embodiment, the mandrel includes a pneumatic system that uses ports 215 to generate directed airflows to help move the item 130 into the loading volume 120. In this example, the ports 215 are disposed on a nozzle 220 that extends from the base 145 and the rollers 135. Additionally or alternatively, the mandrel 105 may include ports for generating directed airflows on the sides 140A-B. Regardless of the location of the ports 215, the ports 215 can direct the airflows in different directions. For example, the ports 215 in FIG. 2 may output airflows to dislodge an item 130 that is to the left, right, on, or immediately in front of the nozzle 220. Further, the directed airflows may move the item 130 into the loading volume.

In one embodiment, the pneumatic system may synchronize the airflows generated by the ports 215 with the movements of the pusher 205. For example, once the pusher 205 has moved the furthest into the mandrel along the induct direction 125, and begins to retract by moving in the opposite direction, the control system can activate the pneumatic system to generate the airflows using the ports 215. In this manner, the pneumatic system can work in tandem with the pusher 205 to ensure the item 130 is moved fully into the loading volume. For example, it is more likely that lighter items, or items with aerodynamic properties that generate forces that counter the pushing force applied by the scoop 210, will come to rest in the areas around the nozzle 220 (e.g., above, to left or right, or immediately in front of the nozzle 220) which can cause issues when sealing the package. However, these types of items are also more easily moved by the airflows generated by the pneumatic nozzle 220 relative to heavier or more aerodynamic items. Put differently, using airflows (rather than actuators or powered rollers) may be better suited to move the types of items that are more likely to become stuck at undesired locations or areas around the nozzle 220 when being loaded into the packaging. Heavier items, which are less effected by the airflows, are more influenced by the actions and functions performed by the pusher 205. Thus, the pusher 205 and the pneumatic system can work hand-in-hand to ensure packages of various weights and shapes are consistently loaded into the loading volume. The pusher 205 can be used with any of the pneumatic systems and embodiments described in "PNEUMATIC MANDREL FOR A PACKAGING SYSTEM" and including the same inventor, which is herein incorporated by reference.

While FIG. 2 illustrates a mandrel 105 with a pneumatic system and rollers 135 for aiding the loading process, the pusher 205 can be used with a mandrel 105 without these features. For example, the packaging system may be used primarily to load heavier items (e.g., more than a pound) or items with aerodynamic properties that are not likely to cause the item to get stuck around the nozzle 220, in which case the pusher 205 with its advantages discussed above may be sufficient on its own to consistently load these types of items into the loading volume.

Figure 3A:
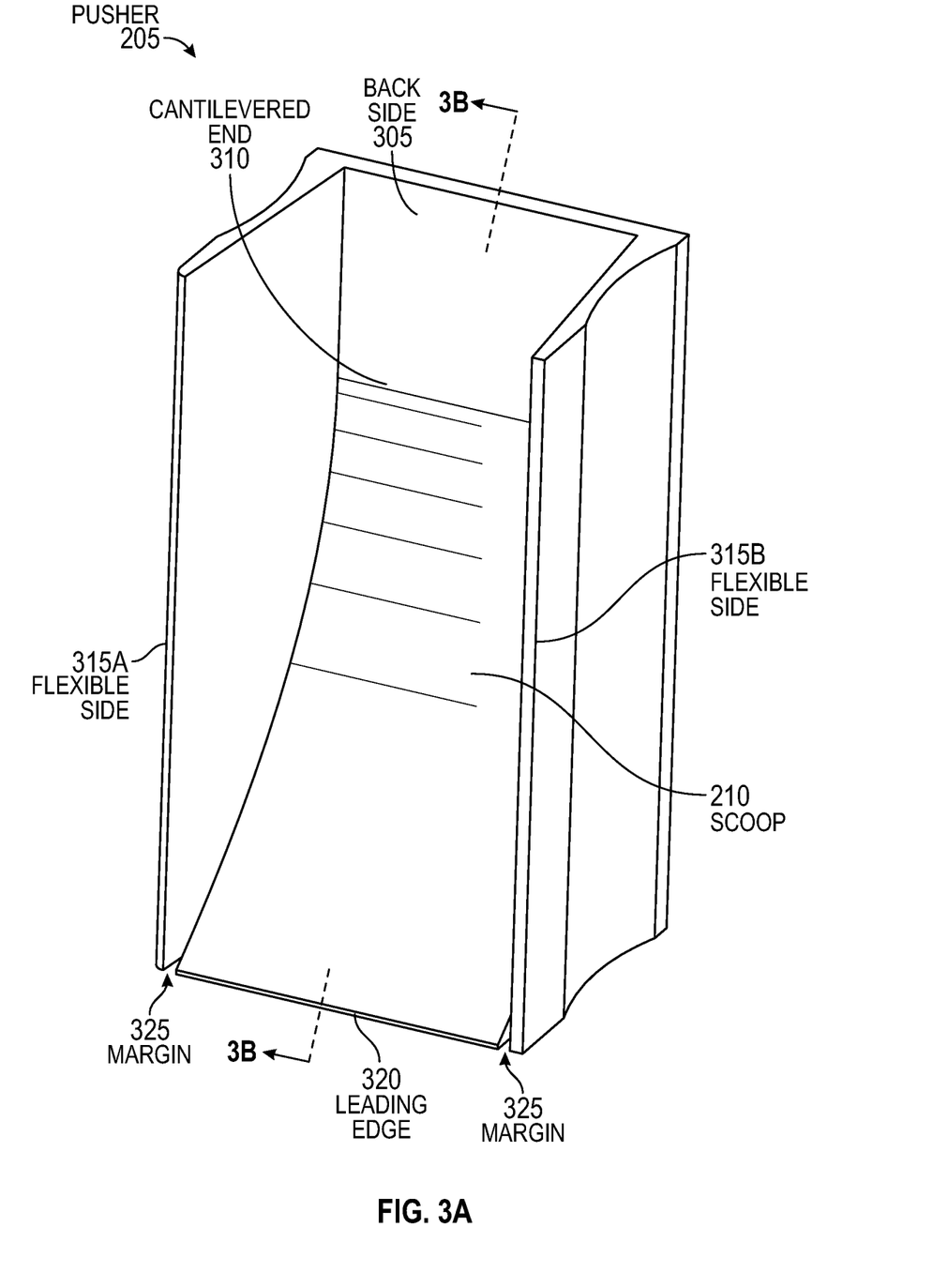
FIGS. 3A and 3B illustrate isometric views of the pusher, according to one embodiment described herein.

FIG. 3A illustrates an isometric view of the pusher 205, according to one embodiment described herein. The pusher 205 includes the scoop 210 disposed between a first flexible side 315A and a second flexible side 315B. In one embodiment, the sides 315A-B are designed to flex inward towards the scoop 210. To permit the sides 315A-B to flex (or compress), the pusher 205 includes margins 325 defining a separation distance between the scoop 210 and the flexible sides 315A-B. Stated differently, in an uncompressed state, the flexible sides 315A-B do not contact at least a portion of the sides of the scoop 210 in a facing relationship with the flexible sides 315A-B. The margins 325 provide a buffer where the sides 315A-B can compress inward before contacting respective sides of the scoop 210 in a compressed state.

In this embodiment, the scoop 210 is cantilevered. That is, the scoop 210 includes a cantilevered end 310 that is coupled to a back side 305 and a leading edge 320 that is not coupled to the back side 305 (or to the sides 315A-B). In one embodiment, the leading edge 320 of the scoop 210 is not attached to any other portion of the pusher 205. A cantilevered scoop 210 may be able to perform a stronger springing action (relative to a non-cantilevered scoop 210) where the leading edge 320 can be compressed (as a result of pushing an item) in a direction towards the back side 305. When the pusher 205 stops moving, the stored energy in the compressed scoop 210 can spring in a direction away from the back side 305 to help propel an item into the item loading volume in the packaging system. One example of the springing action is described below in FIGS. 6A and 6B.

In one embodiment, the scoop 210 has a parabolic shape along its cross section. More specifically, the surface of the scoop 210 that contacts the item has a parabolic or curved shape.

The pusher 205 can be made from any type of material that can perform the functions described herein. In one embodiment, the pusher 205 is formed from plastic (e.g., injection molded plastic). In another embodiment, the pusher 205 is formed from a metal. In another example, the pusher 205 may be formed from fiberglass or carbon fiber.

Figure 3B:
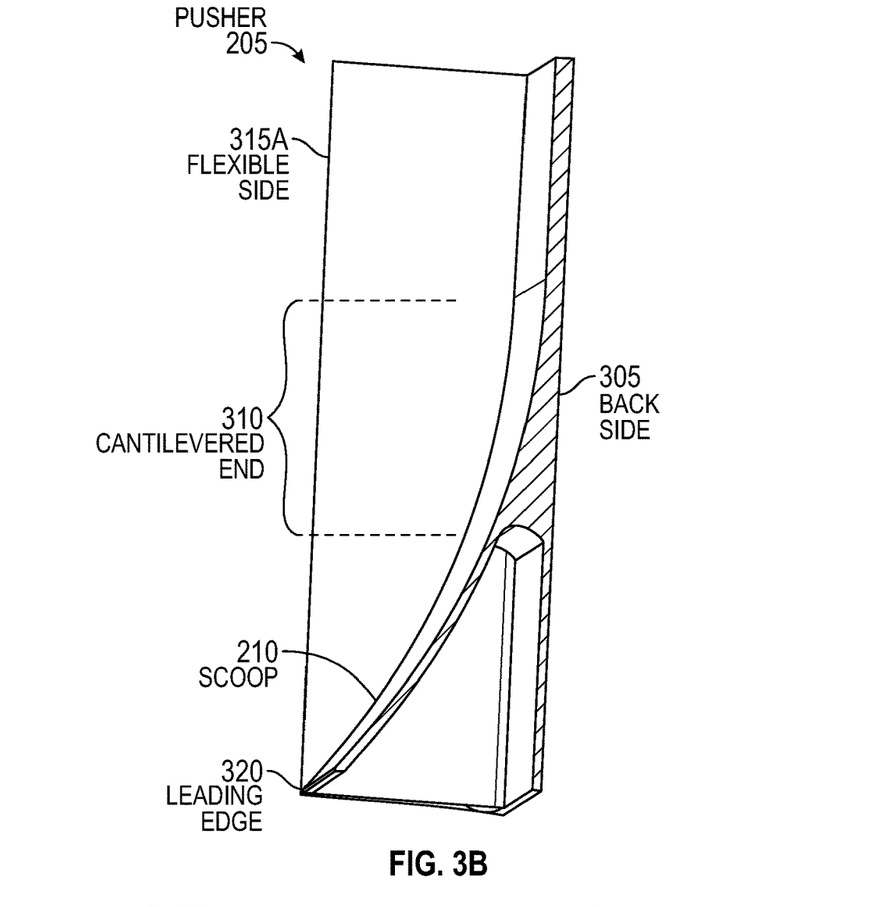

FIG. 3B is a cross section along the line 3B-3B illustrated in FIG. 3A. This cross section better illustrates the cantilevered end 310 of the scoop 210 that connects the scoop 210 to the back side 305.

Figure 4:
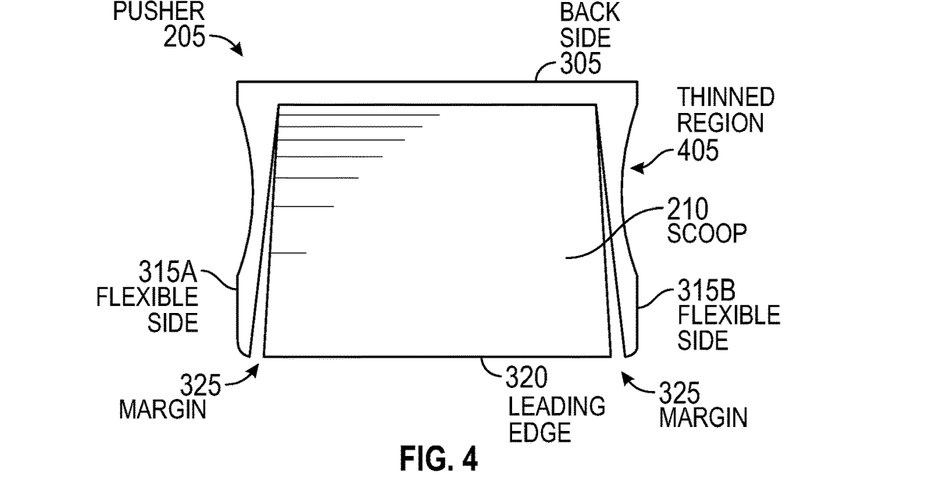
FIG. 4 illustrates a top view of the pusher, according to one embodiment described herein.

FIG. 4 illustrates a top view of the pusher 205, according to one embodiment described herein. As seen from this direction, the flexible sides 315A-B include thinned regions 405 that may increase the flexibility of the sides 315A-B relative to a structure where the sides 315A-B were thicker. The thinned regions 405 can also increase the durability of the flexible sides 315. Stated oppositely, without the thinned regions 405, the flexible sides 315 may experience a structural failure (e.g., snap or break) sooner when being compressed inward.

FIG. 4 illustrates that the width of the margins 325 increases when moving in a direction away from the back side 305. That is, the margins 325 are wider near the leading edge 320 than near the back side 305. The changing width of the margins 325 can correspond to the flex of the sides 315A-B. Because the flexible sides 315A-B are also cantilevered—i.e., attached on one side to the back side while the opposite side is not attached to any other portion of the pusher 205—the flexible sides 315A-B flex more near the leading edge 320 of the scoop 210, wherein the margins 325 are wider. In contrast, when compressed, the flexible sides 315A-B flex less in the region where the sides 315A-B connect to the back side 305, and thus, the width of the margin 325 can be smaller. However, in other examples the width of the margin 325 may be constant.

Figure 5:
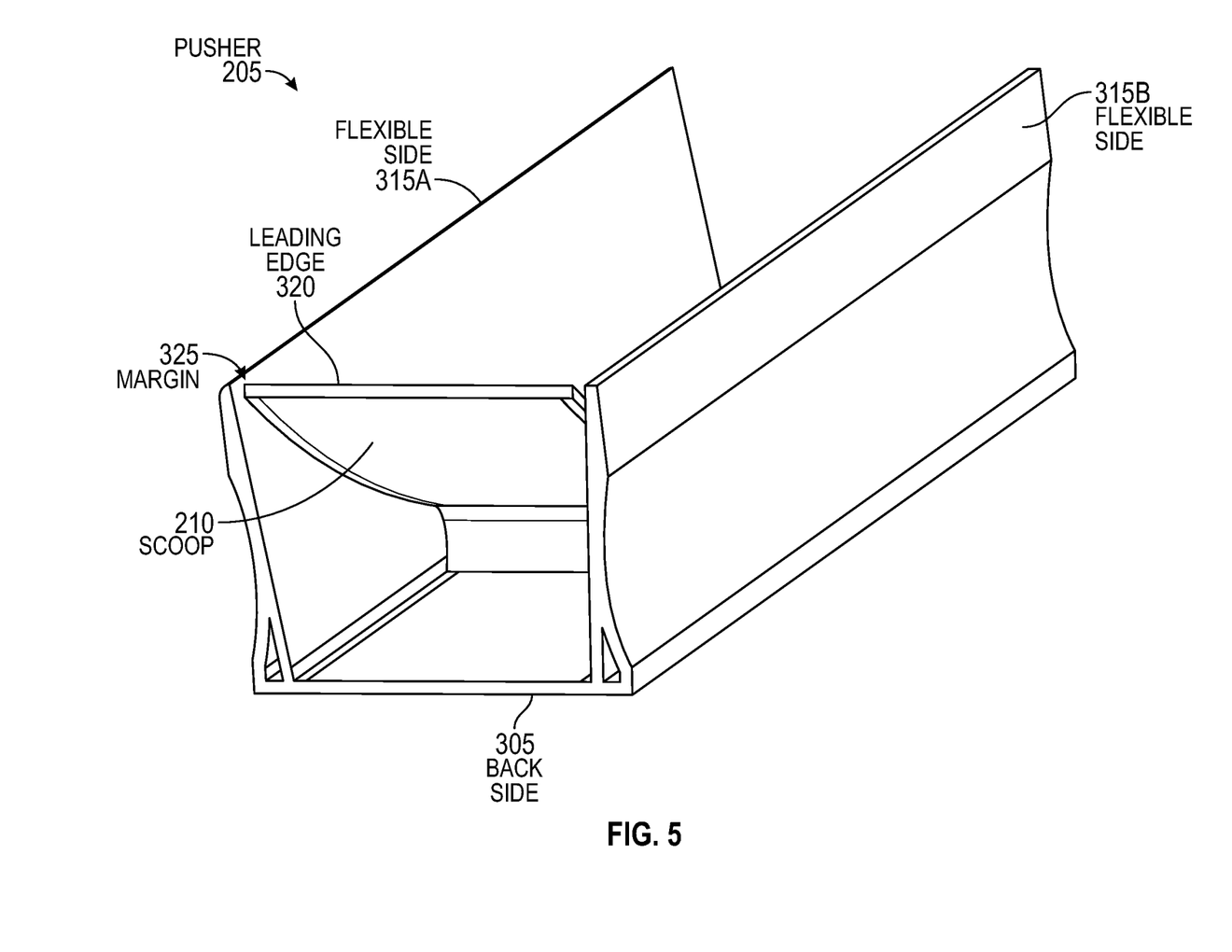
FIG. 5 illustrates a bottom view of the pusher, according to one embodiment described herein.

FIG. 5 illustrates a bottom view of the pusher 205, according to one embodiment described herein. As seen from this view, the leading edge 320 is not coupled to the back side 305 nor to the flexible sides 315A-B. Instead, the leading edge 320 is supported by the cantilevered end of the scoop 210 which is attached to the back side 305, as shown in FIG. 3B.

Figures 6A, 6B:
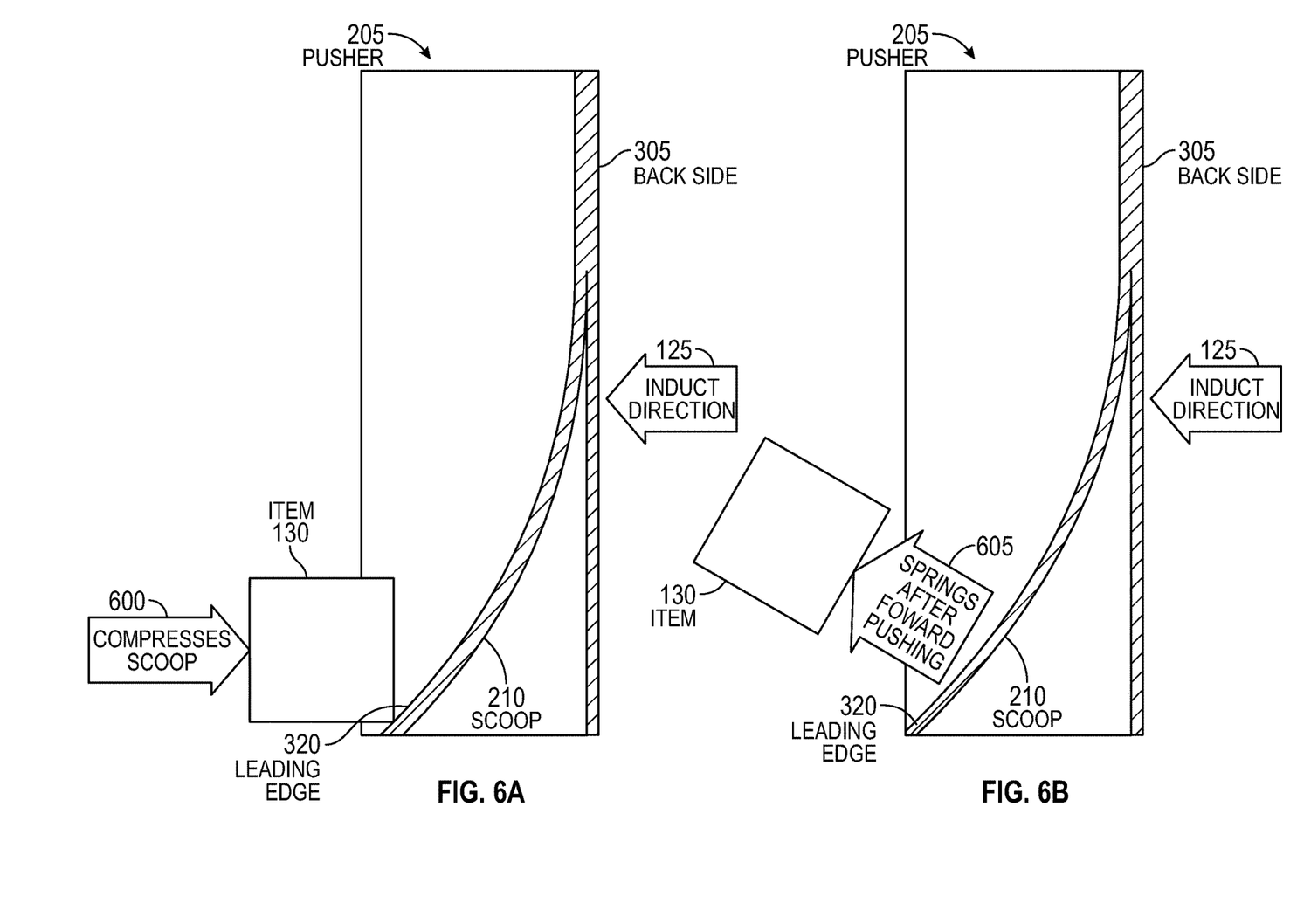
FIGS. 6A and 6B illustrate a springing action of the pusher, according to embodiments described herein.

FIGS. 6A and 6B illustrate a springing action of the pusher 205, according to embodiments described herein. In FIG. 6A, the pusher 205 is forced to the left along the induct direction 125. For example, the pusher 205 may be part of a pushing system that moves items in the induct direction 125 through the mandrel and into the loading volume. Accelerating the pusher 205 to the left causes the scoop 210 of the pusher 205 to contact the item 130. Due to this acceleration, the item 130 applies a force shown by arrow 600 that compresses the scoop 210. That is, the item 130 applies a force on the scoop 210 in a direction that is opposite to the induct direction 125. This force compresses the scoop 210 in a direction towards the back side 305 of the pusher 205. The amount of this compression force varies according to the physical properties of the item 130 (e.g., its weight or whether the item 130 is moving before being contacted by the scoop 210).

If the scoop 210 is cantilevered, such that only one end is connected to the back side 305, the compression force applied by the item 130 primarily effects the scoop 210 that is furthest from the back side 305. That is, the portion of the scoop 210 at its leading edge 320 may be compressed more (e.g., flex further towards the back side 305) relative to portions of the scoop 210 that are closer to the edge of the scoop 210 that is coupled to the back side 305. Stated differently, the item 130 applies a compression force that urges the leading edge 320 from a neutral position to a compressed position. It may be desirable to have the leading edge 320 compress (or flex) more since this portion of the scoop 210 is more likely to contact the item 130, and thus, be able to provide an springing force that opposes the compression force and helps to move the item 130 into the loading volume.

FIG. 6B illustrates a state of the pusher 205 that occurs after the state of the pusher 205 illustrated in FIG. 6A. In one embodiment, FIG. 6B illustrates a time when the pusher 205 has stopped moving or stopped accelerating in the induct direction 125. For example, the pusher 205 may have reached a location in the mandrel where it reverses direction and begins to retract from the mandrel in order to receive another item.

FIG. 6B further illustrates that the scoop 210 applies a springing force (e.g., performs a springing action) illustrated by the arrow 605 that propels the item 130 into the loading volume. Once the pusher 205 stops moving in the induct direction 125, the scoop 210 uses the energy stored from the compression force shown by arrow 600 in FIG. 6A to perform the springing action. That is, the scoop 210 springs forward to at least its previous position before the compression force was applied. Since the item 130 will be in contact with the scoop 210 during this time (in order to apply the compression force while the pusher 205 was moving as shown in FIG. 6A), the springing force propels the item 130 in the direction of the arrow 605.

In one embodiment, the springing force is a supplemental force to move the item 130 into the loading volume. That is, the main force may be provided by the momentum of the item 130 due to the pusher 205 moving in the induct direction 125. The springing force may supplement (or increase) the momentum of the item 130 so the item 130 travels further in a direction towards the loading volume than it would if the scoop 210 did not apply the springing force. However, while the spring force may be a supplemental force, in another embodiment it may be the primary force that moves the item 130 into the loading volume. That is, the springing force may have a larger effect on the momentum or movement of the item 130 than the force applied on the item 130 as the pusher 205 moves in the induct direction.

While FIGS. 6A and 6B illustrate a springing force generated by the item 130 compressing the scoop 210, in other embodiments, the springing force may be generated using an actuator. For example, the pusher 205 may include an actuator connected on one end to the back side 305 and at another end to the scoop 210. The actuator may pull the portion of the scoop 210 near the leading edge 320 towards the back side 305, similar to how the item 130 compresses the scoop 210 as shown in FIG. 6A. When the pusher 205 stops moving, the actuator can release and allow the stored energy due to compressing the scoop 210 to perform the springing action shown by the arrow 605. Thus, the springing action can be passively caused by the item 130 that is being loaded and/or caused by a powered apparatus in the pusher 205.

Figure 7:
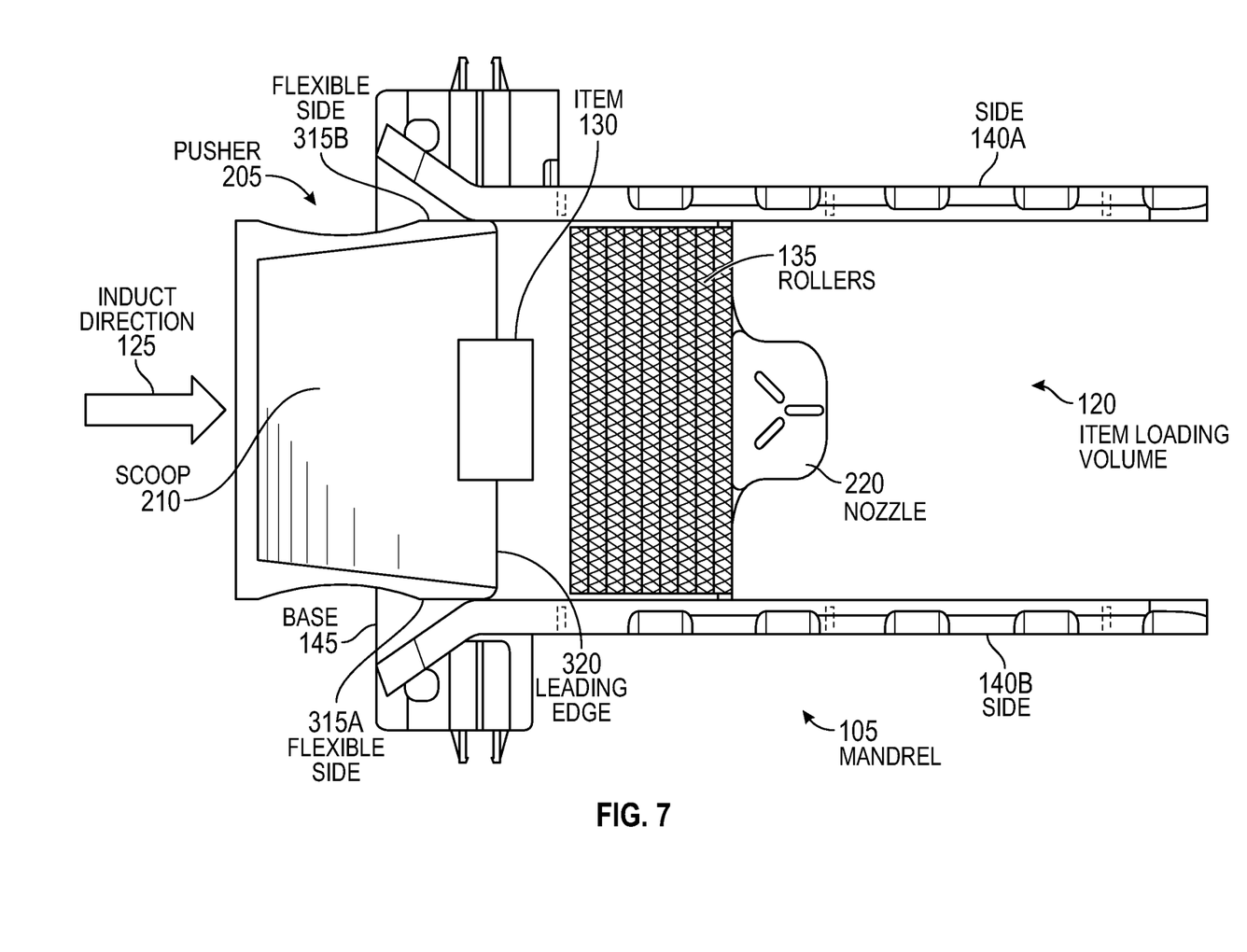
FIG. 7 illustrates a top view of the pusher moving an item through the mandrel, according to one embodiment described herein.
Figure 8:
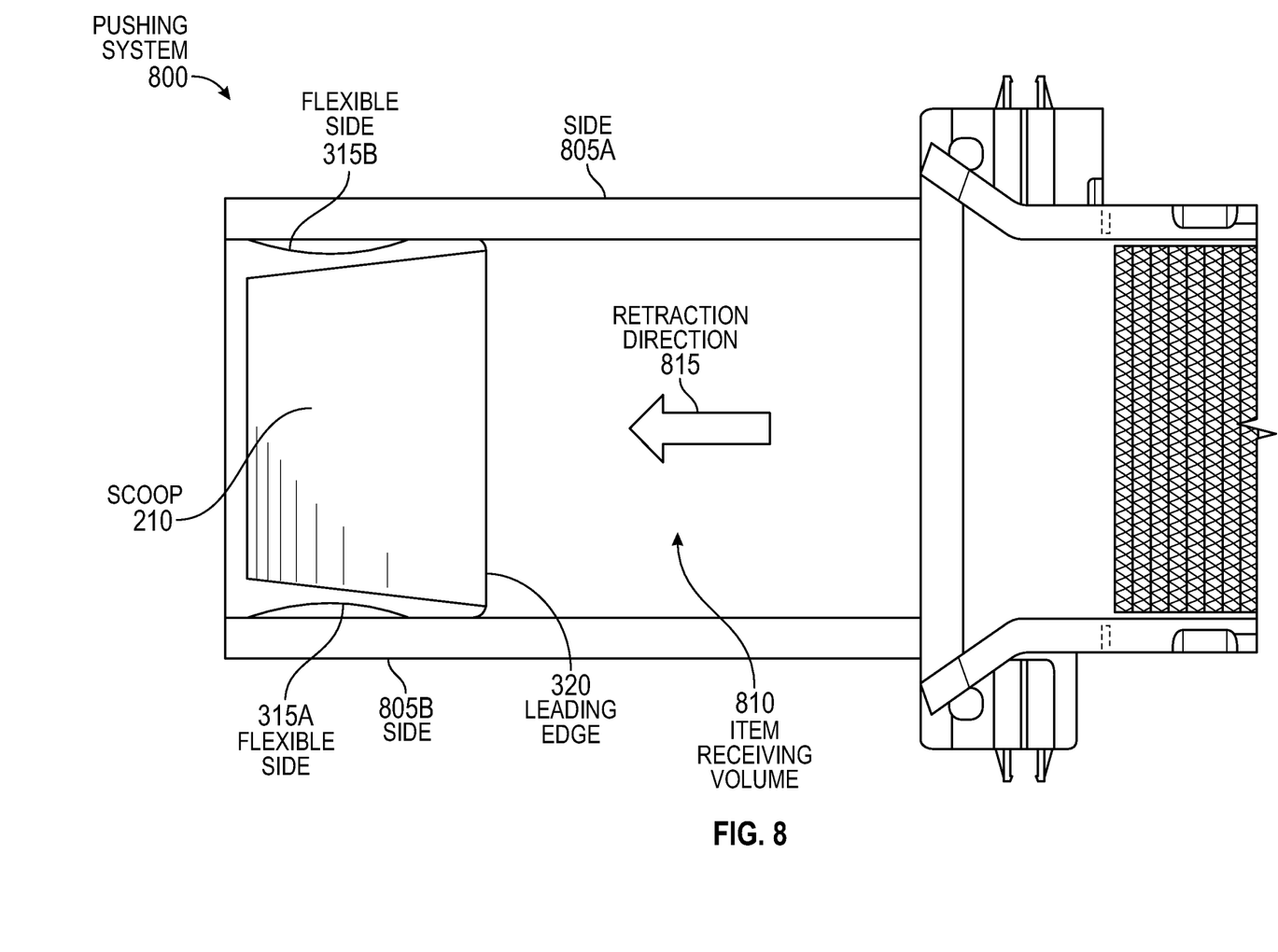
FIG. 8 illustrates a top view of a pusher retracting to receive a new item, according to one embodiment described herein.

FIG. 7 illustrates a top view of the pusher 205 moving an item 130 through the mandrel 105, according to one embodiment described herein. For clarity, the pushing system that moves the pusher 205 through the mandrel 105 is not shown. Instead, the pushing system is shown in FIG. 8.

In FIG. 7, a force is applied to the back side of the pusher 205 in the induct direction 125 that moves the pusher 205 through the mandrel 105 (i.e., between the two sides 140A-B of the mandrel 105). In one embodiment, the pusher 205 moves (e.g., slides) the item 130 across a top surface of the base 145 and the rollers 135. In this example, the spacing between the sides 140A-B of the mandrel 105 is smaller than the spacing between the flexible sides 315A-B of the pusher 205 when in the natural, uncompressed state. Thus, when the pusher 205 is moved between the sides 140A-B of the mandrel 105, the sides 140A-B (which are rigid) force the flexible sides 315A-B to flex or compress towards the scoop 210 (a compressed state). Thus, comparing this top view to the top view shown in FIG. 4 illustrates that the sides 140A-B have compressed the flexible sides 315A-B such that the margins 325 have disappeared. That is, in this compressed state, the flexible sides 315A-B contact the sides of the scoop 210. However, while FIG. 7 illustrates compressing the flexible sides 315A-B to remove the margin 325, in other embodiments, there may remain some margin 325 between the flexible sides 315A-B and the sides of the scoop 210 as the pusher 205 is pushed through the mandrel 105.

Designing the pusher 205 and the mandrel 105 such that the flexible sides 315A-B form a sliding positive contact with the sides 140A-B may help to reduce the likelihood that the item 130 (especially thin items or items with flexible or soft packaging) gets stuck between the sides 315A-B and the sides 140A-B. That is, the positive contact ensures there is no gap between the sides 315A-B and the sides 140A-B in which the item 130 can get snagged or stuck as the pusher 205 moves the item 130 through the mandrel 105.

In one embodiment, the pusher 205 moves in the induct direction 125 until reaching the pneumatic nozzle 220. The momentum of the item 130 provided by the force in the induct direction 125 and the springing force provided by the scoop 210 propel the item 130 into the loading volume 120. The directed airflows generated by the nozzle 220 can also assist in moving the item 130 into the loading volume 120, although other embodiments may not include a pneumatic system and instead rely solely on the forces applied by the pusher 205 to move the item 130 into the loading volume 120.

While FIG. 7 illustrates that the mandrel 105 has rigid sides 140A-B that compress the flexible sides 315A-B of the pusher 205, in another embodiment the sides 315A-B of the pusher 205 can be rigid while the sides 140A-B of the mandrel 105 are flexible. That is, if the same spacing between the sides 140A-B and sides 315A-B is maintained, the rigid sides 315A-B of the pusher 205 can push out (e.g., flex) the flexible sides 140A-B of the mandrel 105 and establish the sliding positive contact described above. To make the sides 315A-B of the pusher 205 rigid, the sides 315A-B may be connected to the sides of the scoop 210 rather than having the margins as shown in FIG. 4.

FIG. 8 illustrates a top view of a pusher 205 retracting to receive a new item, according to one embodiment described herein. As shown, the pusher 205 has moved in a retraction direction 715 which is opposite the induct direction 125 illustrated in FIG. 7. The pusher 205 has moved out of the mandrel 105 and into a pushing system 800. Specifically, the pusher 205 slides between two sides 805A-B of the pushing system 800. Like with the sides of the mandrel 105, the sides 805A-B of the pushing system 800 can establish a sliding positive contact with the flexible sides 315A-B of the pusher 205. This positive contact can mitigate the likelihoods that an item can become stuck between a gap between the flexibles sides 315A-B of the pusher 205 and the sides 805A-B of the pushing system 800. Thus, in this example, regardless whether the pusher 205 is in the pushing system 800 or the mandrel 105, its flexible sides 315A-B are compressed towards the scoop 210 so that a positive contact is formed with the side walls. Further, while in this example the sides 805A-B of the pushing system 800 are rigid, in another embodiment the roles may be reversed where the sides 805A-B are flexible and the sides 315A-B of the pusher 205 are rigid.

Moving the pusher 205 to the location shown in FIG. 8 permits the pushing system 800 to receive a new item in an item receiving volume 810. That is, by sliding the pusher 205 to the left, the pushing system 800 can receive a new item into the item receiving volume 810. The pushing system 800 can then again slide the pusher 205 to the right (i.e., the induct direction) to push the newly received item out of the pushing system 800 and into the mandrel 105 as shown in FIG. 7.

The embodiments herein are not limited to any particular type of pushing system 800. That is, the pusher 205 can be used in any type of system that can receive an item and then apply a force to the pusher 205 to move the item into the mandrel 105. For example, the pusher 205 described herein can be used in the various embodiments described in "AUTOMATIC ROTARY INSERTING MACHINE" U.S. application Ser. No. 16/831,431 filed on Mar. 26, 2020 which is incorporated by reference.

Figure 9:
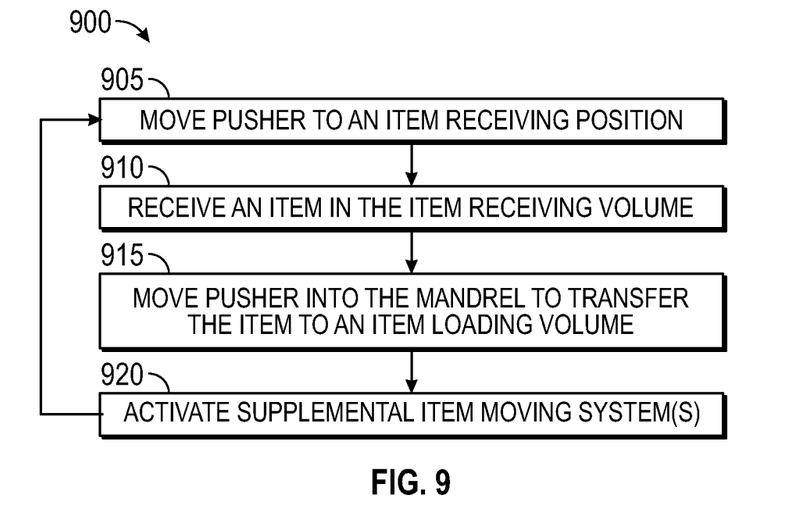
FIG. 9 is a flowchart for operating the pusher, according to one embodiment described herein.

FIG. 9 is a flowchart of a method 900 for operating the pusher, according to one embodiment described herein. In one embodiment, the apparatuses and systems described in the method 900 may be controlled using instructions issued by a control system (e.g., the control system 150 in FIG. 1). At block 905 the pushing system (e.g., as instructed by a control system) moves the pusher into an item receiving position. One example of an item receiving position is illustrated in FIG. 8 where the pusher 205 is to the left of the item receiving volume 810 where a new item can be disposed.

At block 910, the pushing system receives an item in the item receiving volume. For example, a conveyor belt, associate, or picker robot may slide, drop, or place an item into the item receiving volume.

At block 915, the pushing system moves the pusher into the mandrel to transfer the item into an item loading volume. In one embodiment, the pushing system applies a force to the back side of the pusher so that it in turn applies a force to the item to move the item out of the pushing system and into the mandrel. As shown in FIG. 7, the pushing system can continue to apply a force to the pusher 205 such that the item 130 is moved into the item loading volume 120.

In one embodiment, the scoop of the pusher 205 applies a springing force to the item when the pusher is at the item loading volume. The spring force can be a secondary or primary force that moves the item into the item loading volume. In one embodiment, the springing force results from the item compressing the scoop as the pusher moves the item in the induct direction. However, in another embodiment, rather than relying on the item to compress the scoop, the pusher may include a powered actuator for compressing the scoop.

At block 920, the packaging system activates one or more supplemental item moving systems. In one example, the packaging system activates a pneumatic system in the mandrel as described above which outputs directed airflows for moving the item into the loading volume. However, the packaging system may include other supplemental item moving systems such as powered rollers or a conveyor belt.

The method 900 can repeat where the pushing system retracts the pusher at block 905 so that it returns to its item receiving position.

Figure 10:
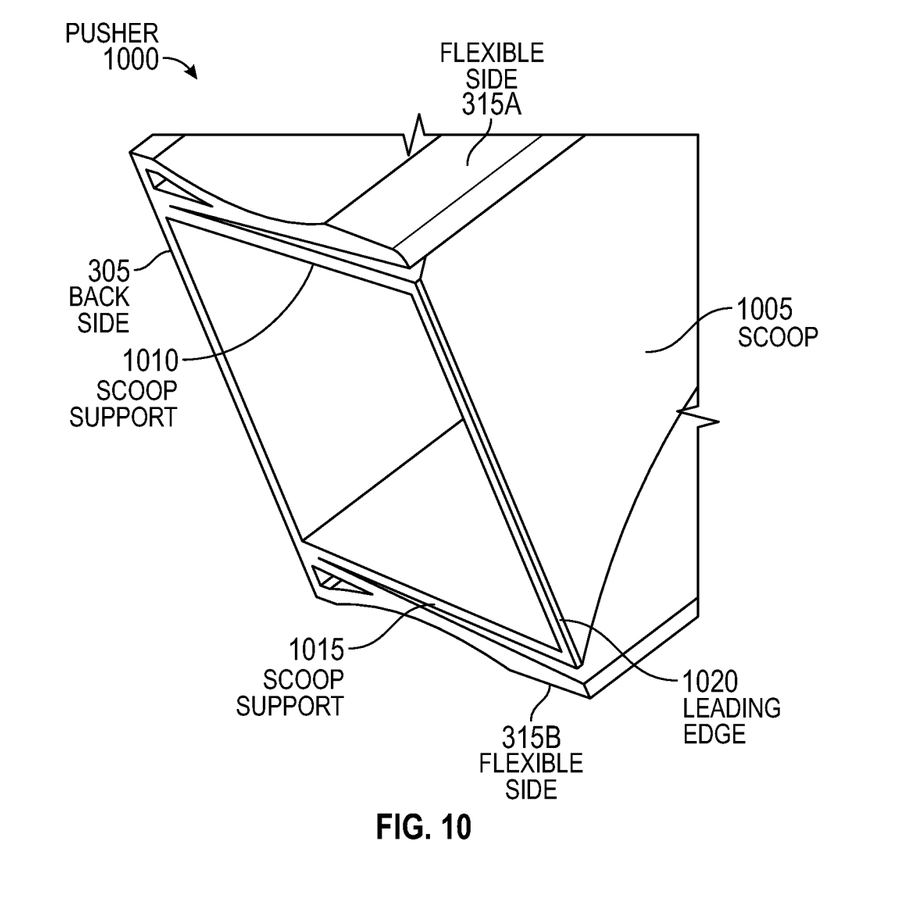
FIG. 10 illustrates a bottom view of a pusher, according to one embodiment described herein.

FIG. 10 illustrates a bottom view of a pusher 1000, according to one embodiment described herein. Like the pusher 205 illustrated in previous figures, the pusher 1000 includes the back side 305 and the flexibles sides 315A-B. These components function like the ones described above, and thus, are not described in detail here.

However, unlike the pusher 205 described above, the pusher 1000 includes scoop supports 1010 and 1015 that extend from the back side 305 to a leading edge 1020 of the scoop 1005. These supports 1010 and 1015 reduce the amount of compression on the scoop 1005 which might reduce the springing force that the scoop 1005 can apply during the scenario illustrated in FIGS. 6A and 6B. That is, scoop 1005 in the pusher 1000 is not cantilevered since the leading edge 1020 is physically connected to the back side 305 via the scoop supports 1010 and 1015. That is, the scoop 1005 is coupled to the back side 305 on multiple sides or ends (e.g., at the sides of the scoop 1005 connected to the supports 1010 and 1015).

Nonetheless, the scoop 1005 can still apply a springing force as shown in FIG. 6B. For example, the supports 1010 and 1015 may not be completely rigid (e.g., could be flexible or bend) so that the scoop 1005 can still be compressed as the pusher 1000 moves an item through the mandrel to store energy which can be used to generate the springing force. Or the scoop 1005 can compress in a region between where the supports 1010 and 1015 are connected to the scoop 1005 in order to generate the springing force.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A pusher for a packaging system, the pusher comprising:
   a back side;
   first and second flexible sides attached to opposite ends of the back side, wherein the first and second flexible sides are perpendicular to the back side;
   a cantilevered scoop attached to the back side at a first end, wherein the cantilevered scoop is disposed between the first and second flexible sides, wherein a second end of the cantilevered scoop, opposite the first end, forms a leading edge for pushing an item into an item loading volume of the packaging system,
   wherein the leading edge is compressible upon application of a compression force to urge the leading edge from a neutral position such that the cantilevered scoop is configured to generate an opposing springing force to move the item into the item loading volume.

2. The pusher of claim 1, wherein the cantilevered scoop is attached to the back side only at the first end.

3. The pusher of claim 1, wherein the cantilevered scoop has a parabolic shape.

4. The pusher of claim 1, wherein the first and second flexible sides are spaced apart from respective sides of the cantilevered scoop to form respective margins between the cantilevered scoop and the first and second flexible sides.

5. The pusher of claim 4, wherein the respective margins enable the first and second flexible sides to flex towards the cantilevered scoop when the pusher is moved through the packaging system.

6. An apparatus, comprising:
   a back side;
   first and second sides attached to the back side, wherein the first and second sides are perpendicular to the back side; and
   a scoop attached to the back side at a first end, wherein the scoop is disposed between the first and second sides, wherein a second end of the scoop, opposite the first end, forms a leading edge for pushing an item into an item loading volume of a packaging system,
   wherein the leading edge is compressible such that the scoop is configured to generate a springing force to move the item into the item loading volume.

7. The apparatus of claim 6, wherein the scoop has a curved shape.

8. The apparatus of claim 6, wherein the scoop comprises a flat surface extending at an angle from the back side, wherein the angle is less than 90 degrees.

9. The apparatus of claim 8, wherein the angle is less than 45 degrees.

10. The apparatus of claim 6, wherein the scoop is cantilevered such that the scoop is coupled to the back side only at the first end.

11. The apparatus of claim 6, wherein the first and second sides are flexible and are not connected to the scoop.

12. The apparatus of claim 11, wherein, when in an uncompressed state, the first and second sides are separated from respective sides of the scoop by respective margins.

13. The apparatus of claim 12, wherein, when in a compressed state, the first and second sides contact at least a portion of the respective sides of the scoop.

* * * * *